125,170

UNITED STATES PATENT OFFICE.

LEWIS S. CHICESTER, OF NEW YORK, ASSIGNOR TO CHARLES F. CHICHESTER, OF BROOKLYN, NEW YORK.

IMPROVEMENT IN PREPARING GRAIN FOR GRINDING.

Specification forming part of Letters Patent No. 125,170, dated April 2, 1872.

*To all whom it may concern:*

Be it known that I, LEWIS S. CHICHESTER, of the city and State of New York, have invented and made an Improvement in Preparing Grain for Grinding; and the following is declared to be a correct description of the same.

Grain when ground requires to be sufficiently dry to prevent the flour subsequently becoming sour. In cold climates it is found that the grain retains considerable moisture, and, if ground in the winter, will be very liable to become injured when the temperature is higher. If the grain is very dry, then the hull will break up into small pieces that dull and clog the millstones, besides producing considerable loss from the flour adhering to the hulls.

My invention is for preventing either of the before-mentioned difficulties and rendering the flour very much superior, and saving loss in the same.

I have discovered that when grain is heated to a temperature of about 150° Fahrenheit immediately before grinding, and then ground at a temperature of about 100° Fahrenheit, the flour will be of a superior quality and there will not be any waste.

The effect produced by this heating operation is as follows: When dry and flinty grain is subjected to this operation the otherwise imperceptible moisture of the grain is driven from the center to the outside of each grain, and this, together with the heat, renders the hull sufficiently tough and pliable to prevent the same being broken so finely during the grinding.

When new or damp grain is subjected to the said heat a portion of the moisture will be driven off, and the hull will be in a condition to prevent the flour adhering; and the heat of the grain is maintained during the grinding and bolting operations sufficiently to insure the evaporation of the moisture, so that the flour will not be subsequently injured by changes of temperature.

The apparatus employed in heating the grain previous to grinding may be a chamber containing tables heated by hot-air that circulates through the grain; but means of this character, being known, do not require further description.

I claim as my invention—

The method herein specified of preparing grain for grinding by the application of artificial heat, as and for the purposes set forth.

Signed by me this 9th day of September, A. D. 1871.

LEWIS S. CHICHESTER.

Witnesses:
GEO. T. PINCKNEY,
CHAS. H. SMITH.